United States Patent Office.

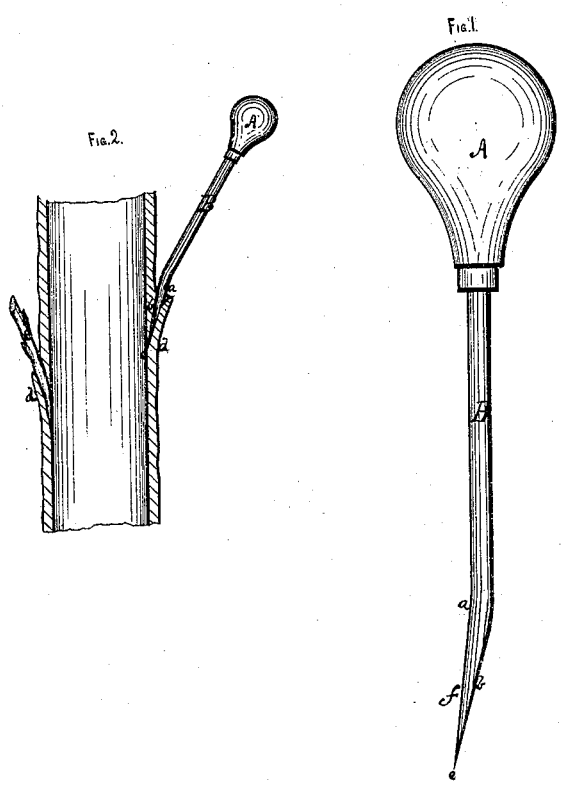

DANIEL BETTS OLIVER, OF CAMBRIA, NEW YORK.

Letters Patent No. 109,442, dated November 22, 1870.

IMPROVEMENT IN GRAFTING-AWLS.

The Schedule referred to in these Letters Patent and making part of the same.

*To all whom it may concern:*

Be it known that I, DANIEL BETTS OLIVER, of Cambria, in the county of Niagara and State of New York, have invented certain new and useful Improvements in Budding-Awls, of which the following is a specification.

Nature of the Invention.

My improvement is for the purpose of making incisions in the bark of trees or limbs, so as to open a space between the bark and the trunk for the insertion of the bud-stem without injuring or otherwise breaking the bark.

The invention consists in the peculiar formation of the tool employed, as hereinafter described.

General Description.

In the drawing—

Figure 1 is a side elevation of the awl.

Figure 2 is a sectional view of a portion of a tree-trunk, with a bud-stem inserted on one side and my improved tool inserted on the other.

A is the handle; and

B, the awl.

At a short distance above the lower end the awl is bent, as shown at $a$, the purpose of which is to make the tool stand at a suitable angle to the tree or limb when in the hands of the operator, as shown in fig. 2.

The rear part of the bent portion is ground off flat, as shown at $b$, while the front portion retains its half-round form, as shown at $f$. This leaves the end $c$ pointed and ovaling upward, being the form most desirable for inserting in the bark.

The novelty in this instrument consists simply in the bend $a$, for throwing the handle from the tree or limb, and the peculiar form of the lower end, which is flat on one side and round on the other, with an oval-shaped point.

This form is specially adapted to the process known as "budding" or "inoculation," which consists in starting the bark from the tree or limb and inserting the bud in place.

Heretofore no proper instrument has been used for this purpose, and the insertion of an ill-shaped point beneath the bark is liable to tear and break it, especially in its tender state.

In my device the flat part rests within the bark against the wood, while the round outer side starts the bark from place, and, by its appropriate conformation to the circle of the bark presses it out gradually and without rupture. The oval point, also, by its gradual cut disturbs the bark in the smallest degree.

The bend of the shaft of the awl allows it to be used in difficult places, either vertically, horizontally, or angularly, without the least trouble.

What I claim and desire to secure by Letters Patent, as a new article of manufacture, is—

The budding-awl herein described, having its end bent at an angle to the shank, and provided on one side with the flat surface $b$, and on the other with the round surface $f$, the whole operating in the manner and for the purpose specified.

In witness whereof, I have hereunto signed my name in the presence of two subscribing witnesses.

DANIEL BETTS OLIVER.

Witnesses:
EDWIN SHEPARD,
E. W. BARNUM.